Sept. 13, 1932.  F. C. THOMPSON  1,877,540
CHANGE SPEED DEVICE
Filed Aug. 13, 1924   3 Sheets-Sheet 1
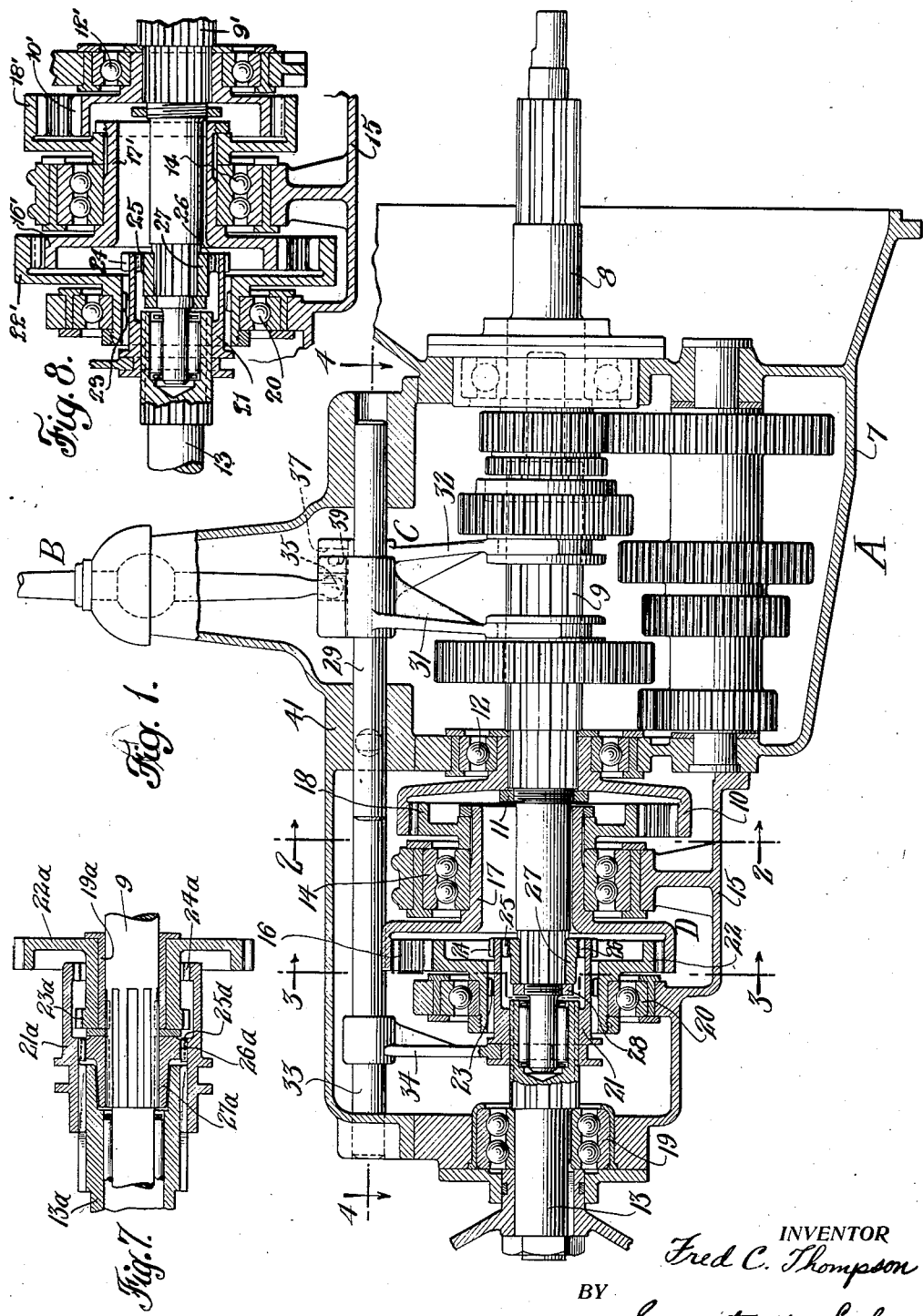
INVENTOR
Fred C. Thompson
BY
Synnestvedt & Lechner
ATTORNEYS Sept. 13, 1932.        F. C. THOMPSON        1,877,540
CHANGE SPEED DEVICE
Filed Aug. 13, 1924        3 Sheets-Sheet 2
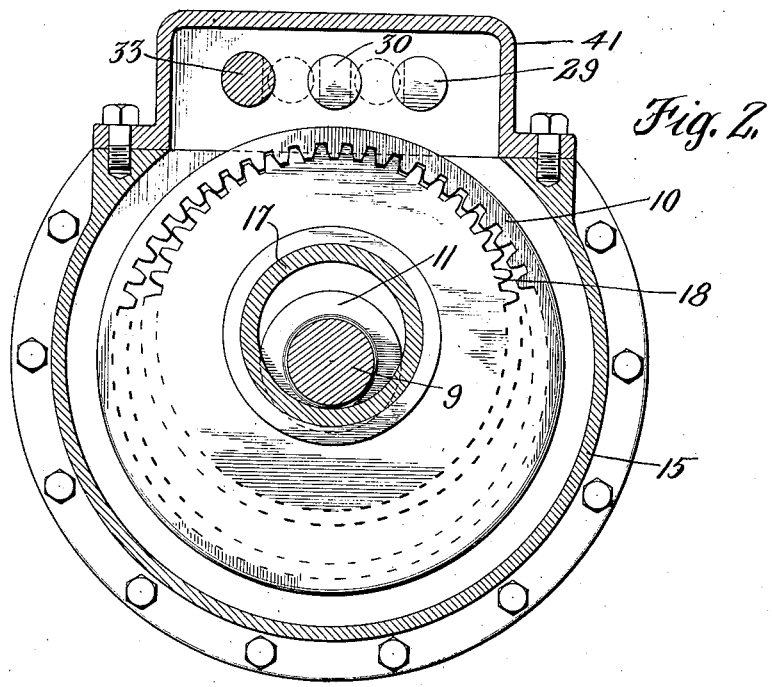
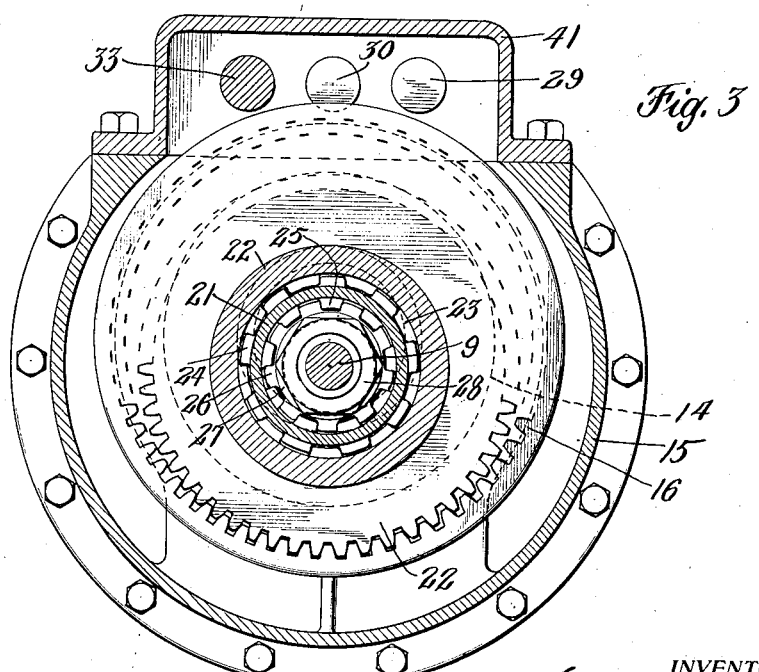
INVENTOR
Fred C. Thompson
BY
Synnestvedt & Lechner
ATTORNEYS Sept. 13, 1932.  F. C. THOMPSON  1,877,540
CHANGE SPEED DEVICE
Filed Aug. 13, 1924   3 Sheets-Sheet 3

INVENTOR
Fred C. Thompson
BY
Synnestvedt & Lechner
ATTORNEYS

Patented Sept. 13, 1932

1,877,540

UNITED STATES PATENT OFFICE

FRED C. THOMPSON, OF DETROIT, MICHIGAN, ASSIGNOR, BY MESNE ASSIGNMENTS, TO AUTOMOTIVE RESEARCH CORPORATION, A CORPORATION OF DELAWARE

CHANGE SPEED DEVICE

Application filed August 13, 1924. Serial No. 731,715.

My invention relates to change speed devices and is more especially concerned with change speed devices applicable to motor driven vehicles, in connection with which it will be described. The invention is also applicable to various types of power machinery using change speed devices as for example engine lathes, power presses, etc.

Automobile transmissions now in general use provide for three speeds forward and one reverse, which take care of power and speed requirements in the usual run of traffic, but do not allow of obtaining the maximum speed which might be had when the engine has attained a high rate of speed.

Certain attempts have been made to provide devices, which, when thrown into use at high engine speeds would increase the speed of the drive wheels, but such of these devices as are known to me have been found to be impractical, complicated or otherwise objectionable.

It is, therefore, one of the objects of this invention to provide a change speed device which is simple to operate, simple in construction, readily applicable to standard transmissions and practical in use.

Another object of this invention is to provide a change speed device to be used in connection with the usual gear transmission in which the shafts making up the combination are at all times aligned.

Still another object is to provide a change speed device which is quiet in its operation and in which the gears bringing about the change of speed are always in mesh.

Still another object is to provide a change speed device in which the change speed gears are of such type as to give extended driving contact and therefore long life.

Still another object is to provide a change speed device which by minor changes may be used as a speed reducing device instead of as a speed increasing device.

How these and various other objects and advantages can be realized through my invention will appear from my description hereinafter of the best construction for the purpose known to me.

In the drawings, Fig. 1 is a sectional elevation thru a standard gear transmission with my invention applied thereto.

Fig. 2 is a cross section taken on line 2—2 of Fig. 1;

Fig. 3 is a cross section taken on line 3—3 of Fig. 1;

Fig. 7 shows a modified form of clutch arrangement.

Fig. 8 is a fragmentary sectional elevation of an arrangement of the invention in which reduced drive may be effected in accordance with the invention.

Figure 4:
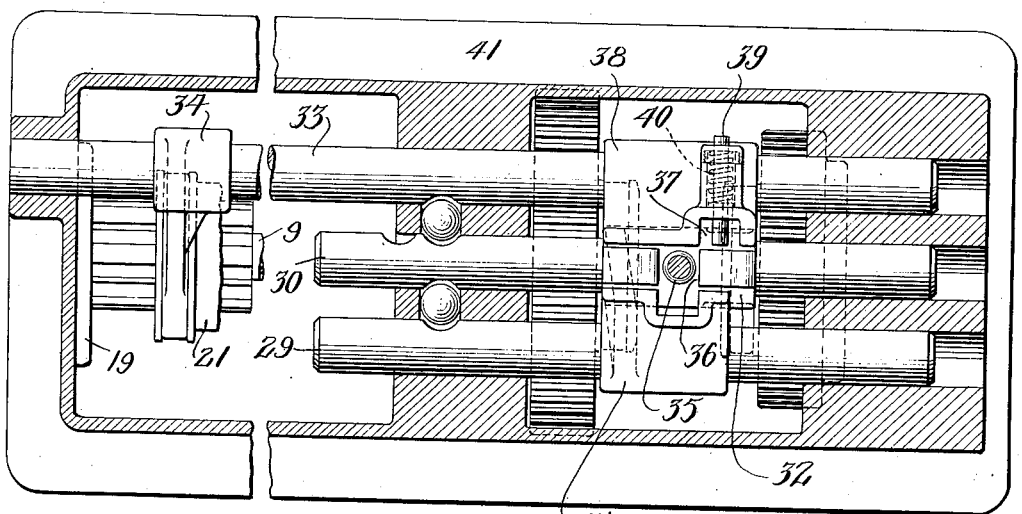
Fig. 4 is a plan section taken on line 4—4 of Fig. 1 with certain of the parts shown in full view, and with the gear shift lever in neutral position.

Referring to Fig. 1 of the drawings I have shown my device applied to the usual form of gear transmission A, which consists of three speeds forward and one reverse, the usual gear shift lever B and the sliding shift bars and forks C which are shifted by manipulating the lever B, said lever being shown in neutral position. The gear transmission is shown mounted in the usual form of housing 7 having a flared portion for housing the usual clutch mechanism, and is adapted to be bolted to the engine block (not shown). The engine shaft is connected to the drive shaft 8 of the transmission by means of any well known type of clutch which drive shaft in turn is connected to the driven shaft 9 of the transmission thru the gearing shown by shifting the lever B to select the desired ratio of gearing.

The driven shaft 9 of the gear set A, which in the ordinary transmission is connected to the front universal joint of the usual propeller shaft, is in this construction arranged to be connected to an auxiliary shaft 13 in two quiet speed relationships by a gearing arrangement, designated generally D, the auxiliary shaft being adapted for connection to the propeller shaft of the vehicle. This gearing arrangement D comprises an internally-externally meshing gear train which may be adapted for connecting the shafts 9 and 13 in either over-driving or under-driving relationship as desired, (overdrive as shown in Fig. 1 and under-drive as shown in Fig. 8). There is, in addition, a simple and suitable operating means for connecting the shafts 9 and 13 directly to each other for direct drive, the same operating means, as shown, rendering the internal-external gearing active and idle.

As shown in Fig. 1, the shaft 9 is journalled in a suitable bearing 12 in a transverse wall of the gear casing and extends beyond this wall to a pilot bearing in the forward end of the shaft 13, the shaft 13 being supported in a suitable bearing 19 in the rearmost wall of the casing part 15, housing the gear set D. By this arrangement, the main shafting of the gear set D is well supported and the shafts are maintained in permanent axial alignment. The internal-external trains includes a gear 10, an internal as shown in Fig. 1, secured to the shaft 9, the hub of the gear being embraced and supported by the bearing 12. The gear 10, as shown, is secured to the shaft by a suitable nut 11. There is also a gear 22 having external teeth, as shown in Fig. 1, which gear 22 is mounted, as will be hereinafter explained, coaxially with the gear 10 and adapted for driving association with the shaft 13, the two gears 10 and 22 being connected by a compound eccentric gear having both internal and external teeth, which in the embodiments shown mesh constantly with the two coaxial gears.

The compound gear and supporting arrangement is designed particularly for sturdiness and compactness of construction ease of assembly and also efficiency, flexibility and quietness of operation. The axis of the compound gear is offset from the axes of the shafts 9 and 13 and held securely and permanently in this position with the pitch lines of the two cooperating internal-external gear couples in tangency on opposite sides (above and below, as shown) of the shafts. The compound gear may include an internal gear 16 having a hollow shank 17 extending therefrom through the bore of which the axes of the shafts 9 and 13 pass and through which a portion of the shaft 9 extends, to permit the adjacent ends of the shafts 9 and 13 to be coupled together for direct drive, as will be hereinafter shown. At the end of the shank 17 opposite the internal gear 16 is an external gear 18, which, as shown, comprises a separate part of the compound gear. The external teeth of the gear 18 mesh with the internal teeth of the gear 10. The compound gear may comprise a single piece to reduce the cost of manufacture but in the gear relationships shown and where the shank 17 is small with relation to the gear sizes, this would require a split bearing which may of course be provided. The bearing for the compound gear comprises, as shown, a conventional double ball bearing 14 having inner and outer ball races, the inner bearing race member being embraced between the separate gear part 18 and a suitable shoulder on the opposite end of the gear shank 17. The gear 18 is shown as secured to the shank 17 by means of a suitable key and nut of conventional construction.

To support the bearing 14 and the compound gear with the axis thereof permanently offset from the axes of the driven and auxiliary shafts 9 and 13, I provide a hollow bracket forming, as shown, a part of the casing 15 and which extends in embracing and supporting relationship to the bearing 14 between the planes of the gears 16 and 18. In the arrangement shown, the driving reactions at both ends of the compound gear are substantially equally balanced against each other, resulting in very quiet operation indefinitely. Bearing strains are reduced to a minimum by eliminating unequal overhang of the gear parts with reference to the bearing, and also by making both internal gears on the same diameters; likewise, the externals. One advantage flowing from having the internal and external gear teeth offset from each other longitudinally of the gear is that this arrangement permits the use of a comparatively small external bearing which may be simply and adequately supported from the casing walls without presenting difficulties in casting or assembling. If both sets of gear teeth of the compound gear were substantially in the same plane as in arrangements of similar gear devices previously known, then the gears would necessarily overhang a simple bearing such as shown at one end, with resulting greater strain on the bearing and wear on the gear teeth, shortening the effective life of the gearing. A more complex arrangement of bearings increases the cost, presents difficult assembly problems, and in practice places additional frictional load on the rotating parts. It is to be understood that various sizes of gears may be used and that the amount of eccentricity of the compound gear may be changed to obtain various different speed ratios between the members coupled by the internal gearing. The bearing may be made any length desired and otherwise modified for different designs and adaptations.

At a point intermediate the offset bearing 14 and the auxiliary shaft bearing 19 I have provided a bearing 20 for the gear 22, which bearing is coaxial with the auxiliary shaft but of sufficient diameter to receive the clutch member 21 slidingly splined to the auxiliary shaft 13 and the hub of the external gear 22.

The inside surface of the hub portion of gear 22 is provided with jaws 23 which are engaged by the jaws 24 on the outside surface of the sleeve-like clutch member 21 when the clutch member is moved to the left. On the inside surface of the member 21 I have provided other jaws 25 which engage the jaws 26 on the member 27 which is splined to the extension of the driven shaft 9 and securely held in place by the nut 28. Thus it will be seen that when the clutch is in its right hand position as shown in Fig. 1 connection is made between the driven shaft 9 of the gear transmission and the auxiliary shaft 13 whereby a direct drive is obtained, the gears of the change speed device D revolving idle and without function. When the clutch is shifted to its left hand position connection is made with the gears of the change speed device D bringing about a change of speed of the auxiliary shaft 13 with respect to the driven shaft 9. Obviously such shifting to the left disengages the jaws 25 and 25. How the shifting of the clutch is brought about will be hereinafter described.

While I preferably mount the gear 22 as above described I have shown in Fig. 7 an alternative arrangement in which the external gear 22a is rotatably mounted on a bushing 19a which may be splined or otherwise secured to the extension of the driven shaft 9. In this instance the hub portion of the gear 22a is provided with external jaws 23a which are engaged by the internal jaws 24a on the inside surface of the sleeve-like clutch member 21a when the clutch member is moved to the left. The clutch member 21a is slidingly splined to the auxiliary shaft 13a. On the inside surface of the member 21a I have provided other jaws 25a which engage the jaws 26a on the member 27a which is securely splined to the extension of the driven shaft 9. The operation of the clutch member is the same as above pointed out in connection with the preferred arrangement.

The particular arrangement shown in the drawings is for increasing the speed of the auxiliary shaft over that of the gear transmission, the increase in this instance being approximately 30%. As above stated this ratio may be varied by using different sized gears and by changing the amount of offset of the bearing 14. It is to be understood that by simply reversing the gear train of the change speed device D a reduction may be accomplished instead of an increase. That is to say, the internal gear 10 would be replaced by an external gear 10', external gear 18 by an internal gear 18', internal gear 16 by an external gear 16' and external gear 22 by an internal gear 22', the clutching arrangement and the offset being the same as for a speed increase.

Figs. 2 and 3 clearly show the offset arrangement of the gears and the clutch jaws.

Referring to these figures it will be noted that by using the particular type of gears shown, the stresses are divided between a number of teeth which affords great rigidity and strength, as well as quiet running of the gears.

The gear shift lever B functions exactly as does the gear shift lever of the usual form of gear transmission except for the additional shift which operates the change speed device clutch.

Referring more especially to Figs. 1, 4, 5 and 6 it will be seen that by shifting the lever B to the left and then rearward, first or low speed is obtained; then by shifting forward to the centre and to the right and then forward, second speed is obtained; then by shifting rearward third speed or direct drive is obtained. This constitutes the usual sequence followed when shifting gears for forward drive in the standard form of gear transmission, in which two shift bars 29 and 30 and two forks 31 and 32 are employed. In addition to this I introduce a third shift bar 33, and third fork 34 and an additional position of the gear shift lever for throwing my change speed device into and out of play. In the arrangement shown this is accomplished by bearing to the right on the gear shift lever B after the third speed has been selected then bearing forward. In bearing to the right the ball end 35 of the lever B leaves the slot 36 in the fork 32 and enters the slotted portion 37 of the member 38 secured to the third shift bar 33, which member normally assumes the position shown in full lines in Fig. 4 and in dot and dash lines in Fig. 5, and then by the forward movement of the lever B the ball end 35 moves rearward carrying with it the member 38, bar 33, fork 34 and sliding clutch member 21, causing the jaws 24 to engage the jaws 23 whereby the speed change device is brought into operation. Reversing the movement of the gear shift lever to third speed position again brings the shafts 9 and 13 into direct connection.

In order to prevent the gear shift lever B from entering the slot 37 in the member 38 at times other than when intended, a spring pressed plunger 39 is provided for preventing entering of the lever B into the slot. The leverage obtained in shifting the lever to clutch position being ample to overcome the tension of the spring 40.

Figure 5:
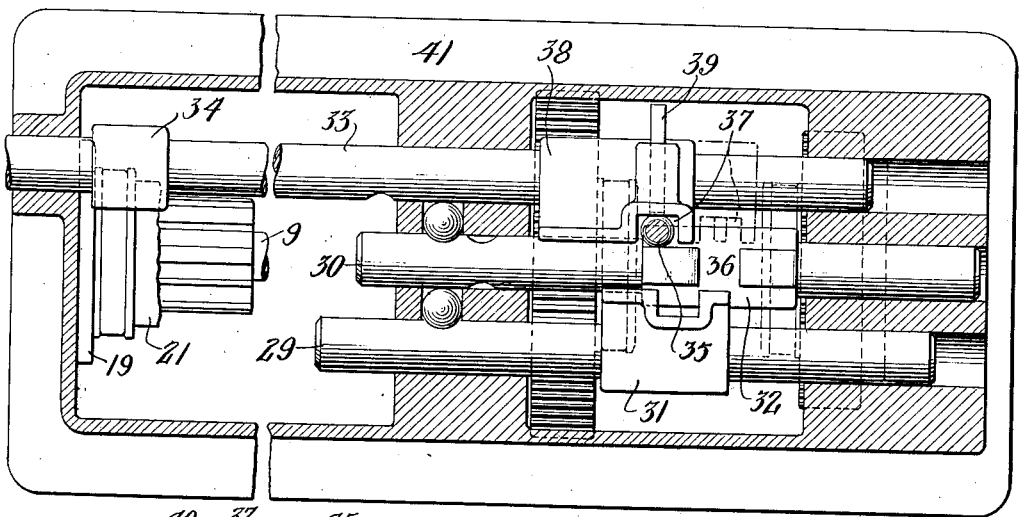
Fig. 5 is a plan section similar to Fig. 4 with the gear shift lever in clutch operating position.
Figure 6:
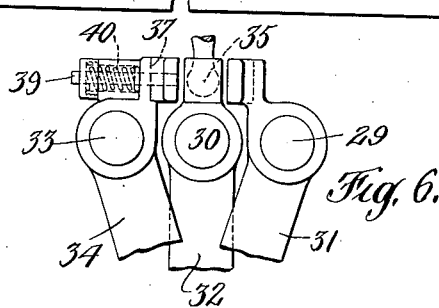
Fig. 6 is a fragmentary end view of the shift bars and forks, removed from the casing.

It is apparent from Figs. 4 and 5 that it is impossible to shift the member 38 and fork 34, controlling the auxiliary gearing, from the position in which the fork 34 is holding the clutch sleeve 21 in direct drive affording position, as between the shafts 9 and 13, except when the shafts 8 and 9 are directly connected together—fork 32 moved forwardly or to the right, Fig. 1. The advantage of this is that the auxiliary internal-external gearing is not rendered active at high torque. Therefore, the internal-external gearing may be made very light in construction, whereas if it were possible to operate the gears thereof when, for example, the transmission A is operating in low or reverse speeds, then the auxiliary internal-external gearing would have to be made much stronger and therefore heavier in order to stand the strain under such conditions.

The arrangement just described is claimed in a divisional application hereof, Serial No. 565,309, filed Sept 26, 1931.

In making the various shifts just described the usual foot clutch is operated in the usual manner to avoid clashing.

Owing to the manner in which my change speed device is mounted and to the construction of the casing 15 it will be seen that the device is readily attachable to standard transmission with slight changes to the driven shaft 9 and by replacing the usual cover plate by the cover plate 41 which carries the shift bars and the gear shift lever. In like manner the device may be attached to various other types of machinery in which additional speed changes as above pointed out are desirable.

I claim:

1. In a transmission, aligned driving and driven shafts, a gear ring eccentrically positioned around one of said shafts, external-internal gearing between said gear ring and driven shaft, a counter-shaft driven by said driving shaft and selective gear trains between said counter-shaft and the gear ring.

2. In combination, in a gearing, a pair of rotatable members, an external gear for one of the members and an internal gear for the other, a hollow eccentrically mounted gear member for connecting said gears, in surrounding relation to one of said members and having sets of internal and external teeth permanently in mesh with the external and internal gears respectively, said sets of teeth being offset longitudinally of the axis of rotation, and selective means for connecting one of the two first mentioned gears to its shaft for one speed and for connecting the adjacent ends of the shafts together for another.

3. In a gearing, a casing, a pair of rotatable members extending thereinto, a gear drivingly rigid with one of the members, a gear for the other, an eccentrically mounted hollow gear member for connecting said gears, said gear member having longitudinally separated sets of teeth, each set being in mesh with a respective first mentioned gear, bearings externally of said gear member and rigidly supported by the casing, and a clutch member having two clutching positions, one position establishing a connection between the shafts through the gears and the other position establishing direct connection between the shafts.

4. In a gearing, a casing, a pair of rotatable members extending thereinto, a gear drivingly rigid with one of the members, a gear for the other, an eccentric compound gear member for connecting said gears, said gear member having longitudinally separated sets of teeth for meshing with respective aforesaid gears, bearing means externally of said gear member and disposed between the said sets of teeth thereof for supporting the compound gear member on a fixed axis of rotation, and operating means to drivingly couple the said rotatable members to each other in two speed relationships, one speed being through the intermediacy of the gears.

5. In a gearing, a stationary casing, a pair of rotatable members carried thereby in permanent mutual alignment, a gear on one of the members, a gear for the other, a hollow compound gear member through the bore of which the axes of the rotatable members pass, said compound gear having separate sets of teeth, one for each of said first named gears respectively, a bearing support for the compound gear externally thereof and rigid with the casing to maintain the axis of the compound gear in permanent stationary eccentric relation to the first mentioned gears, and an axially movable member to connect the rotatable members for two speeds, one speed being through the intermediacy of the gears.

6. In a gearing, a casing, a pair of axially aligned rotatable members supported by the casing, one a driving member, the other a driven member, a gear on one member, a gear for the other, a hollow compound gear arranged to connect the aforesaid gears and through the bore of which compound gear the axes of the rotatable members pass, means externally of the compound gear and rigid with the casing for supporting the gear on an axis fixed with relation to the casing and eccentrically of the said rotatable members, and operating means arranged to drivingly couple the rotatable members directly together for one speed and through the intermediacy of the gears for another.

7. In a gearing, a casing, a pair of rotatable members, extending thereinto in mutual alignment and substantially abutting relation, a gear on one of the members, a gear for the other, a hollow gear member in surrounding relation to one of said members and having a plurality of sets of teeth, one set for each of the gears respectively, a bearing for supporting the hollow gear member on a fixed axis of rotation, said bearing being carried by the casing and located exteriorly of the hollow gear, and clutch means operating in bridging relation to the adjacent ends of said rotatable members and arranged to render the gear train drivingly idle when in one position and to at such time directly connect the said rotatable members together.

8. In a gearing, a stationary casing, a pair of rotatable members, gears for each of the members coaxial with the respective members, a hollow compound eccentric gear having separate sets of teeth in different transverse planes connecting the aforesaid gears, a bearing support in the casing located in a plane between the planes of the gear teeth, and means arranged, when in one position, to connect the members directly, and, when in another position, to connect the rotatable members through the intermediacy of the gears, said means including an element passing through the hollow compound gear.

9. In a transmission, a housing, a pair of aligned shafts therein, a bracket in said housing having an opening eccentric to said aligned shafts, a gear having both internal and external teeth mounted in said bracket, a gear concentric with said aligned shafts secured to one of said shafts, a second concentric gear freely rotatable about said aligned shafts, said concentric gears each being in driving relation with said eccentric gear, means to clutch one of said shafts to the other shaft or to said rotatable concentric gear.

10. In a gearing, a casing, a pair of rotatable members extending thereinto, a gear drivingly rigid with one of the members, a gear for the other, an eccentric gear member for connecting said gears, said gear member having longitudinally separated sets of teeth for meshing with respective aforesaid gears, bearing means for said gear member located substantially midway between said sets of teeth for supporting the gear member on a fixed axis of rotation with equal overhang thereof at both ends of the bearing, and operating means to drivingly couple the said rotatable members to each other in two speed relationships, one speed being through the intermediacy of the gears.

In testimony whereof, I have hereunto signed my name.

FRED C. THOMPSON.